T. G. SAXTON.
CLAMP DEVICE.
APPLICATION FILED JAN. 29, 1910.
1,122,311. Patented Dec. 29, 1914.
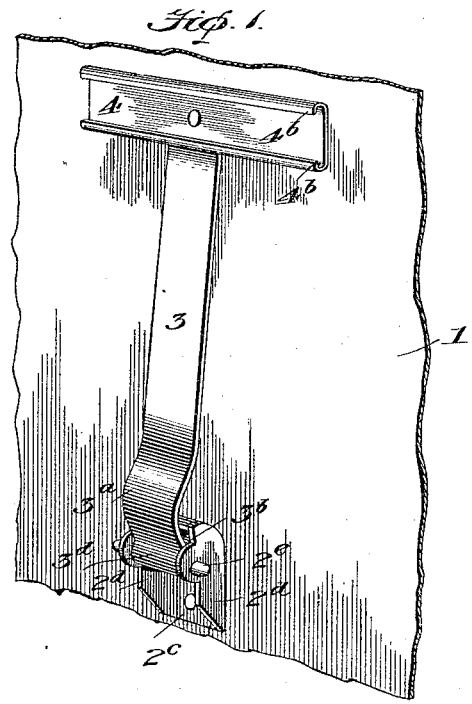
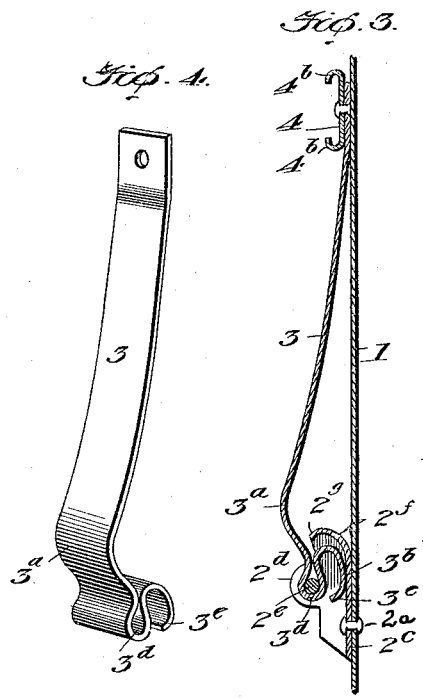
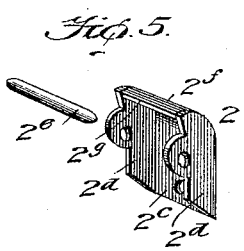
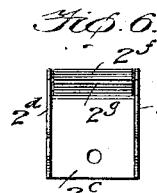
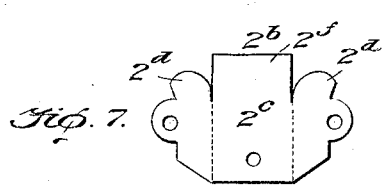
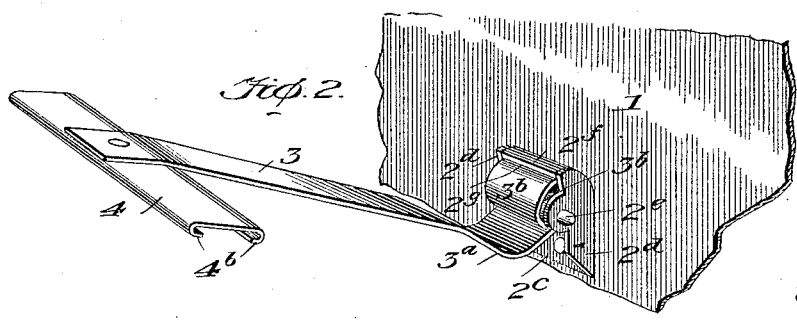
Witnesses
Inventor
Thomas G. Saxton
By Edward D. Alexander
Attorney

UNITED STATES PATENT OFFICE.

THOMAS G. SAXTON, OF LEXINGTON, KENTUCKY, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

CLAMP DEVICE.

1,122,311.      Specification of Letters Patent.      Patented Dec. 29, 1914.

Application filed January 29, 1910. Serial No. 540,902.

*To all whom it may concern:*

Be it known that I, THOMAS G. SAXTON, a citizen of the United States, residing at Lexington, in the county of Fayette and State of Kentucky, have invented certain new and useful Improvements in and Relating to Clamp Devices, of which the following is a specification.

This invention relates to clamping devices for securing and holding articles in place against a support or back.

For the purpose of illustration, I have, in the accompanying drawings shown, and herein described, one form of device embodying my invention.

Figure 1 is a perspective view of a portion of a support or back showing a clamping device, embodying my invention, in position thereon. Fig. 2 is a view similar to Fig. 1, but showing the clamping device in open or reclined position. Fig. 3 is a longitudinal sectional view through Fig. 1. Fig. 4 is a perspective view of the clamping device. Fig. 5 is a perspective view of the devices, separated, for pivotally supporting the clamp in position. Fig. 6 is a front view of the supporting block. Fig. 7 is a view of the blank from which the supporting block is formed.

In the drawings, 1 indicates a support or back against or upon which articles, as for instance papers or paper slips, are supported. The support or back 1 is preferably formed from sheet metal.

2 indicates a supporting or bearing block fixed, as by a rivet $2^a$, to the support 1. The supporting block 2 is preferably formed from a suitable blank $2^b$ having a base $2^c$, opposite side portions $2^d$, $2^d$, which are bent upwardly at substantially right angles to the base to form bearings or supports for a pin or pintle $2^e$, and an upwardly and forwardly curved wing $2^f$. The free end of the wing $2^f$ is bent downwardly to form a stop $2^g$, for a purpose to be hereinafter described.

3 indicates a clamp device for detachably securing paper slips upon or against the support or back 1. The clamping device 3 is preferably curved outwardly and inwardly intermediate its ends, as shown at $3^a$, in order that the upper free end thereon may bear directly against the support 1, and secure the paper slips thereon. The lower end of the clamp 3 is pivotally mounted upon the pin $2^e$, whereby it may be swung from the position shown in Fig. 1 to the position shown in Fig. 2 under certain circumstances.

$3^b$ indicates a yieldable arm or cam plate carried by the clamp 3 and engaging the support 1, or block base $2^c$, for maintaining the clamp 3 in operative position, as shown in Fig. 1.

In the preferred form of the invention, the clamp 3 and plate $3^b$ are formed from a strip of resilient metal. The plate $3^b$ is preferably slightly curved, as shown at $3^e$, to permit it to easily slide on the block base $2^c$ or support 1 when the clamp 3 is reclined or returned to operative position. As shown in Fig. 4, the strip is bent to form a loop $3^d$, which surrounds the pin $2^e$, whereby the latter pivotally supports the clamp 3 upon the support 1.

In operating the clamp device 3, it will be understood that the cam plate $3^b$ normally maintains the clamp 3 in the position shown in Fig. 1. While in this position the free end of the clamp 3 may be sprung outwardly, relative to the face of the support 1, to permit the insertion or removal of paper slips, as desired. By catching hold of the clamp 3 and pulling outwardly thereon, the plate $3^b$ will be moved upwardly and out of contact with the support 1, permitting the clamp 3 to swing downwardly. When thus operated, the downward movement of the clamp will be limited by the lower or free edge of the plate $3^b$ engaging with the stop $2^g$, as shown in Fig. 2. By constructing the clamp 3 whereby it may be bodily moved from the normal operative position to an abnormal or reclined position a large number of paper slips may be conveniently and readily inserted or removed from behind the clamp by a single operation; and by connecting the plate $3^b$ to the clamp 3 whereby both are moved simultaneously by a single operation, the clamp 3 may be quickly and positively thrown into and out of operative position, relative to the support 1.

4 indicates a display plate carried by the upper free end of the clamp 3. This plate may have on its face a name, mark, index or functionally equivalent device. As shown in the drawing, the opposite longitudinal edges of the plate are preferably turned over, as indicated at 4^b, whereby a card carrying the name, index, or equivalent device may be slid in endwise.

To those skilled in the art of making clamping devices of the class described many alterations in construction and widely differing embodiments and applications of my invention will suggest themselves, without departing from the spirit and scope of the claims. My disclosures and the description therein are purely illustrative, and are not intended to be in any sense limiting.

What I claim is:

1. In a device of the character described, the combination with a support, of a bearing block fixed thereto and provided with a stop, a pivot supported by said block, and a spring clamp mounted on said pivot and swingable bodily relative to said support, the said clamp comprising a strip of resilient metal bent upon itself to form a bearing loop through which the pivot extends and an arm below the loop arranged to engage the adjacent face of the support and maintain the strip in operative position, the upper end of the strip being movable toward and from the support independently of bodily swingable movements of the strip, and the free end of the arm being arranged to engage the stop of the bearing block for limiting the swinging movement of the metal strip.

2. In a device of the character described, the combination with a support, of a bearing block fixed thereto and having spaced side walls, a pivot pin supported at its opposite ends by the side walls, and a spring clamp formed from a strip of resilient metal and provided near its lower end with a bearing loop that is rotatably mounted on the pivot pin and permits the spring clamp to be bodily moved about the pivot relative to said support, the portion of the strip beyond the bearing loop being bent back on itself to form a yieldable arm arranged to engage the adjacent face of the support and normally maintain the spring clamp in operative position with its upper end pressed thereagainst, whereby its upper free end may be moved toward and from the support independently of its bodily swingable movements about the pivot pin.

3. In a device of the character described, the combination with a support, of a pivot device mounted thereon, a stop arranged adjacent to said pivot device, and a spring clamp formed from a strip of resilient metal and bent near its lower end to form a loop that is rotatably mounted on said pivot device and permits the spring clamp to swing bodily relative to said support about said pivot device, that portion of the strip beyond the bearing loop being bent back on itself to form a yieldable arm that engages with the adjacent face of the support and normally maintains the spring clamp in operative position, whereby its upper free end may be moved toward and from the support independently of its bodily swingable movements about the pivot pin, and the free end of the yieldable arm being extended and arranged to engage the stop to limit the bodily movement of the clamp.

4. In a filing appliance, the combination with a support, of a pivot pin mounted thereon, and a strip of resilient metal bent intermediate its ends into a loop to receive the pivot and permit the bodily swinging of the strip on said pivot relative to the support, the opposite ends of the strip normally pressing against the adjacent face of said support, the upper end of the strip being movable toward and from said support independently of the bodily swingable movements of said strip and operating to detachably hold papers in engagement therewith and the lower end of the strip operating to maintain the upper end in operative position, the said lower end being doubled on itself to form a yieldable arm which permits the strip to be bodily moved into an inoperative position and back again.

5. In a device of the character described, the combination with a support, of a strip of resilient metal having one end bent back upon itself to form a cam plate, and means for pivotally connecting said strip to the support at a point adjacent to said plate, the strip being swingable about the axis of said pivot to move said cam plate into and out of operative position, when in operative position the said plate pressing yieldingly toward said support and adapted to cause the other end of the strip to yieldingly hold slips in engagement therewith, and when in inoperative position said plate swinging with the free end of said strip away from said support to permit the disengagement of said free end therefrom, the slip engaging end of the strip being movable toward and from said support independently of the swinging movements of said strip.

6. In a device of the character described, the combination with a support, of a strip of resilient metal having one end bent back upon itself to form a cam plate, means for pivotally connecting said strip to the support at a point adjacent to said plate, the strip being swingable about the axis of said pivot to move said plate into and out of operative position, when in operative position the said plate pressing yieldingly toward said support and adapted to cause the other end of the strip to yieldingly hold slips in engagement therewith, and when in inoperative position said plate swinging with the free end of said strip away from said support to permit the disengagement of said free end therefrom, and a stop to limit the throw of said eccentric loop, the resiliency of the strip permitting the slip engaging end thereof to move toward and from said support independently of its swingable movements.

In testimony whereof I affix my signature, in the presence of two witnesses.

THOMAS G. SAXTON.

Witnesses:
LAURENCE C. KEELER,
EDWARD R. ALEXANDER.